United States Patent [19]

Gray et al.

[11] Patent Number: 5,316,335
[45] Date of Patent: May 31, 1994

[54] SELF PIERCING COVER ASSEMBLY AIR BAG

[75] Inventors: John Gray, Union; John Galloway, Nottingham, both of N.H.

[73] Assignee: Davidson Textron Inc., Dover, N.H.

[21] Appl. No.: 990,028

[22] Filed: Dec. 14, 1992

[51] Int. Cl.[5] .............................................. B60R 21/22
[52] U.S. Cl. .................................. 280/728 B; 280/732
[58] Field of Search ............... 280/728 R, 728 B, 732; 220/267, 277, 279, 280, 284; 83/588

[56] References Cited

U.S. PATENT DOCUMENTS

| | | | |
|---|---|---|---|
| 4,097,064 | 6/1978 | Ikawa et al. | 280/732 |
| 4,989,896 | 2/1991 | DiSalvo et al. | 280/732 |
| 5,035,444 | 7/1991 | Carter | 280/732 |
| 5,046,758 | 9/1991 | Rafferty et al. | 280/732 |

Primary Examiner—Karin L. Tyson
Attorney, Agent, or Firm—Reising, Ethington, Barnard, Perry & Milton

[57] ABSTRACT

A self piercing cover assembly for concealing an air bag restraint system in a vehicle passenger compartment has a plurality of retractable cutter blades that are attached to the underside of an invisible door beneath the instrument panel by leaf springs. When the air bag inflates, it pushes the cutter blades out against the bias of springs to cut through the instrument panel at several locations along the front edge of the door making it easier for the door to swing open. The cutter blades retract under the action of the leaf springs so that the cutting edges are below the surface of the cover assembly to protect against contact with the cutting edges after the air bag collapses.

8 Claims, 4 Drawing Sheets

SELF PIERCING COVER ASSEMBLY AIR BAG

BACKGROUND OF THE INVENTION

This invention relates generally to air bag restraint systems and more particularly to a cover assembly for concealing an air bag restraint system in a vehicle passenger compartment.

SUMMARY OF THE INVENTION

U.S. Pat. No. 5,035,444 granted to James C. Carter Jul. 30, 1991 discloses a self piercing cover assembly for concealing an air bag restraint system in a vehicle passenger compartment. The cover assembly has a smooth outer cover with a layer of foam elastomer between the cover and a load bearing insert that has a hinged door. The cover assembly also includes a three sided cutter on the end of a pivot arm that is hinged on the insert. The cutter and pivot arm are stored beneath the closed door so that inflating the air bag pivots the arm outward and the cutter cuts through the foam elastomer and cover layers at the front and side edges of the door making it easier for the door to swing open when the air bag inflates. When fully inflated, the air bag bends the pivot arm at a weakened section so that the cutter and hinged door are retained in an outward position against a windshield to protect against passenger contact with sharp cutting edges of the cutter.

The object of this invention is to provide a self piercing cover assembly for an air bag that protects against passenger contact with its cutting edges after the air bag collapses irrespective of the position of its hinged door.

A feature and advantage of the self piercing cover assembly of this invention is that it does not require permanent deformation of any part for protecting against passenger contact with sharp cutting edges after the air bag collapses.

Another feature and advantage of the self piercing cover assembly of this invention is that it is more versatile in application because it does not require the proximity of the windshield for protecting against passenger contact with sharp cutting edges after the air bag collapses.

Still another feature and advantage of the self piercing cover assembly of this invention is that it is more universal in application because it does not require that the door be retained in any other particular position to protect against contact with sharp cutting edges after the air bag collapses.

Yet another feature of the self piercing cover assembly of this invention is that the cutter automatically retracts as the air bag collapses so that sharp cutting edges are below the outer surface of the cover assembly to protect against contact with sharp cutting edges after the air bag collapses.

BRIEF DESCRIPTION OF THE DRAWINGS

The above and other objects, features and advantages of the invention will become more apparent from the following description taken in conjunction with the accompanying drawings wherein like references refer to like parts and wherein.

DESCRIPTION OF THE INVENTION

Figure 1:
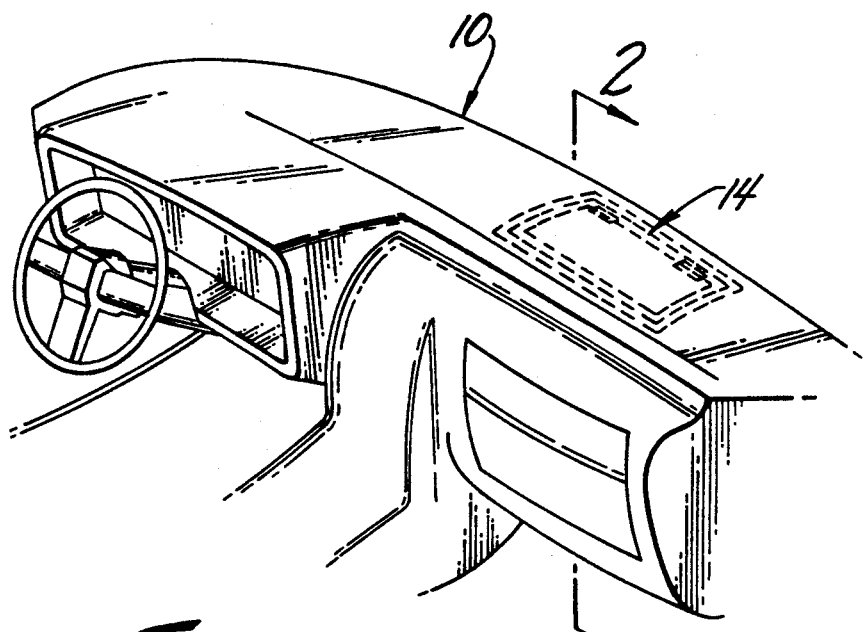
FIG. 1 is a perspective view of an instrument panel assembly including a self piercing cover assembly in accordance with this invention.

Referring now to the drawing, FIG. 1 shows an instrument panel 10 having an air bag restraint system 12 located beneath a self piercing cover assembly 14 constructed in accordance with this invention. In this particular instance, the air bag restraint system 12 is located beneath a shelf portion of the instrument panel on the passenger side of the vehicle. However the self piercing cover assembly of this invention can be used on the driver side as part of the steering wheel; on either side as part of a front or passenger facing portion of the instrument panel; or as part of any other decorative panel in the passenger compartment.

The air bag restraint system 12 includes an air bag housing 16 that encloses a gas generator 18 for supplying an inflatant to an air bag 20 that is collapsed, folded and packed in the housing 16. The folded air bag 20 includes an inlet end 22 connected to a passage for flow of the inflatant from the gas generator 18 into the air bag. The air bag also includes a nose end 24 at the opposite end of the folds that is positioned to operate the self piercing cover assembly 14 of this invention when the air bag 20 inflates.

Figure 2:
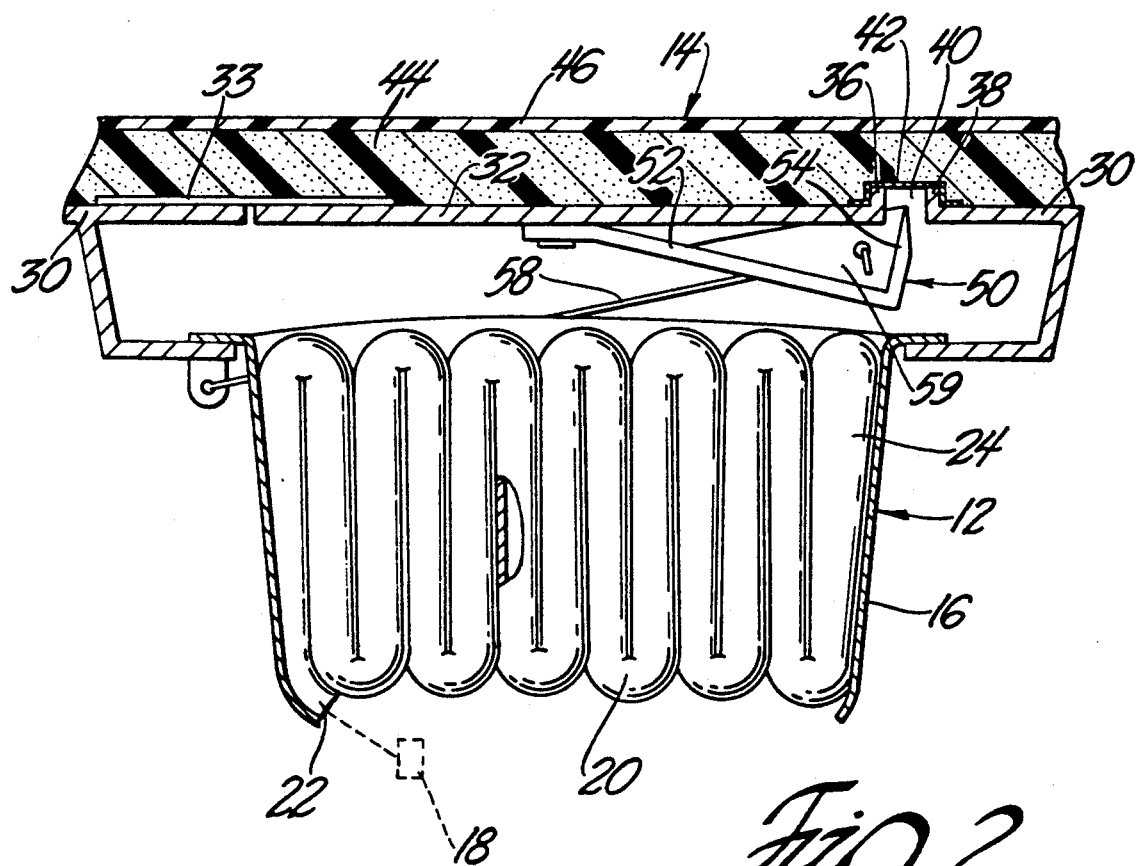
FIG. 2 is a fragmentary sectional view taken substantially along the line 2—2 of FIG. 1 looking in the direction of the arrows.

The cover assembly 14 comprises a support 30 of sheet metal or other relatively stiff material that is secured beneath the instrument panel 10 preferably by being insert molded as part of the instrument panel itself. The support 30 includes a door 32 that closes a rectangular opening 34 in the support 30. The door 32 is connected to the support 30 by a hinge 33 at the back end. The front end of the door 32 has a flange 36 that is spaced from a flange 38 at the edge of the rectangular opening 34. This maintains a slot 40 at the front end of the door 32 when it is in the closed position and also reduces the thickness of the instrument panel 10 in the area of the slot 40 as shown in FIG. 2. The slot 40 is sealed by tape 42 to facilitate manufacture.

The outer surface of the support 30 and the hinged door 32 is bonded to a layer of a suitable energy absorbing elastomeric foam, such as urethane foam that forms a cushion 44 in an underlying relationship to a polymeric skin or shell 46 of vinyl or the like that forms an outer decorative surface of the instrument panel 10. The skin 46 does not have any break lines, tear lines or weakened sections that are visually perceivable from the exterior of the instrument panel 10 so as to detract from its aesthetic appearance. Thus the self piercing cover assembly 14 of this invention provides an invisible door arrangement for the deployment of the air bag 20.

Figure 3:
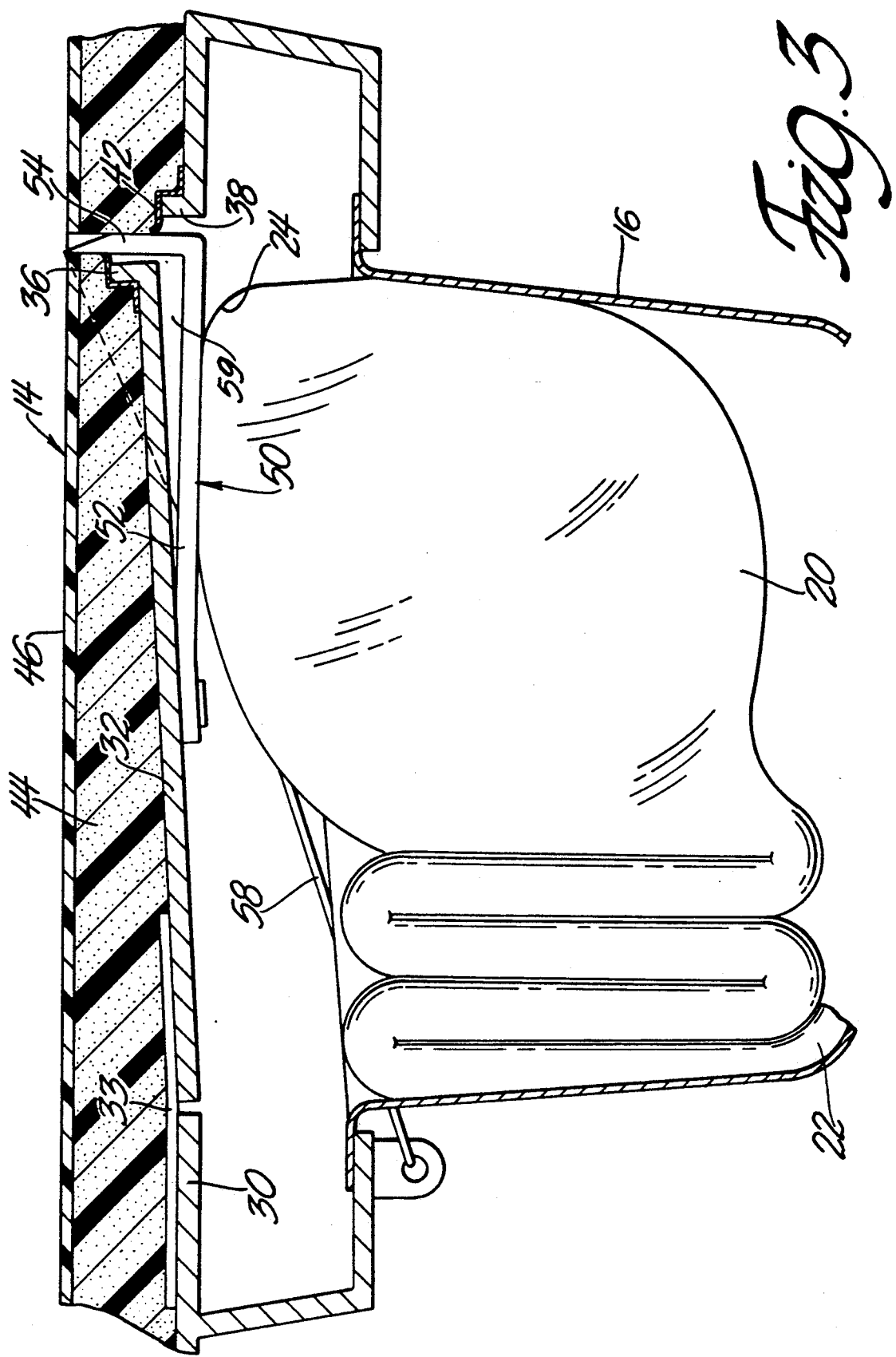
FIG. 3 is an enlarged fragmentary sectional view showing the cutting blades extended and cutting through the cover during the initial stages of air bag inflation.

The support 30 of the cover assembly 14 has a depending bracket 48 that holds the air bag housing 16 beneath the rectangular opening 34 in spaced alignment with the door 32. The cover assembly 14 also has piercing means in the form of a plurality of generally L-shaped piercing members 50 that are disposed in the space between the door 32 and the air bag 20 that is provided by the bracket 48. The L-shaped piercing members 50 have longer legs that are attached to the underside of the door 32 at one end by heat staking or other suitable means. The attached ends are bent so that the longer legs slant away from the lower surface of the door 32 and act as cantilevered leaf springs 52. The shorter perpendicular legs have sharp edges at their tips and thus act as cutter blades 54. These cutter blades 54 are aligned with the slot 40 to cut through the tape 42, cushion 44 and skin 46 as shown in FIG. 3. The height of the cutter blades 54 is greater than the combined thickness of the tape 42, cushion 44 and skin 46 so that the cutter blades 54 cut cleanly and completely through the decorative panel 10. In this regard it should be noted that the flanges 36 and 38 not only decrease the thickness of the decorative panel 10 where it is to be cut but also allow taller cutter blades 54 by providing space for their tips. The piercing members 50 may be made of spring steel, plastic or any other suitable material that has that requisite cutting and spring characteristics.

Figure 5:
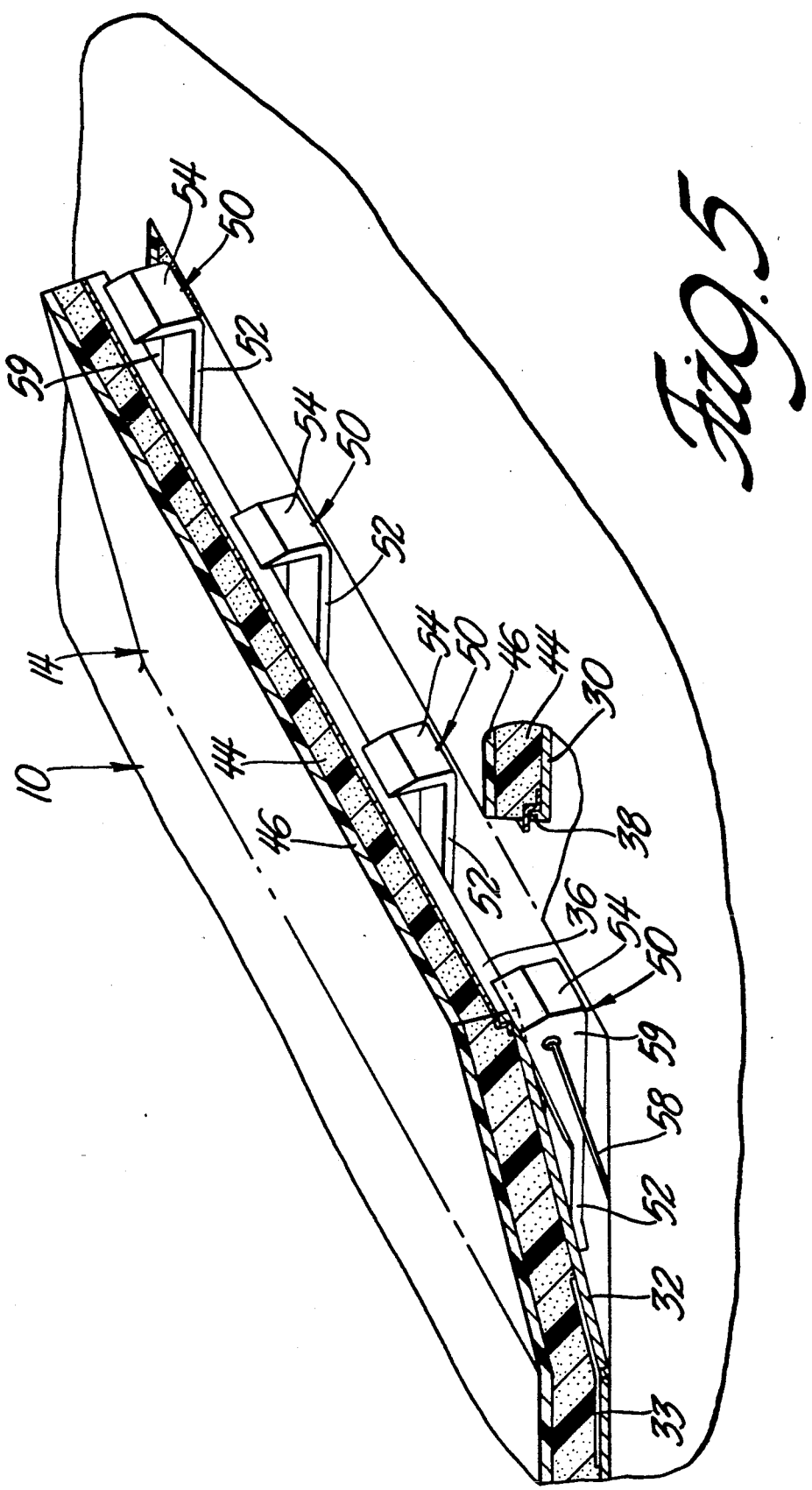
FIG. 5 is an enlarged perspective showing an end view of the door partially opened with the cutting blades retracted below the skin that is attached to the door.

The self piercing air bag assembly 14 preferably also includes cutting cables or wires 58 that are attached to the support 30 and to gusset plates 59 at the outboard side of each of the end piercing members 50 as best shown in FIG. 5. The gusset plates 59 have sharp cutting edges. The function of these gusset plates 59 and the cutting cables 58 is explained below.

The self piercing cover assembly 14 operates in the following manner. When the gas generator 18 is triggered due to a vehicle deceleration, the air bag 20 inflates at the nose end 24 first and then progressively back toward the inlet end 22. Consequently the nose end 24 engages the piercing members 50 and the initial load of the inflating air bag pushes the piecing members 50 outwardly so that the cutter blades 54 project through the slot 40 and cut through the tape 42, cushion 44 and skin 46 at several locations. This forms a greatly weakened tear line at the front of the door 32 that is easily ruptured by the door 32 itself as it is subsequently outwardly pivoted by the force of the inflating air bag 20 until it hits the windshield 56. In this regard, it should be noted that the size and number of piercing members 50 can be varied to meet the particular needs of the materials that are used in the cushion 44 and skin 46 of the instrument panel 10.

The cushion 44 and skin 46 of the instrument panel 10 are cut open at the sides of the door 32 first by the sharp edges of the gusset plates 59 and then by cutting cables or wires 58 which cut through the cushion 44 and skin 46 of the instrument panel 10 at the sides of the door 32 as the door 32 is being pivoted open by the inflating air bag 30. Alternatively the cushion 44 and skin 46 of the instrument panel 10 may be opened at the sides of the door 32 such as by the force of the door 32 itself, possibly in combination with invisible side tear lines in the skin 46. The use of gusset plates 59 and cutting cables or wires 56 provides the additional benefit of tethering the door 32 after the decorative instrument panel 10 has been opened up.

Figure 4:
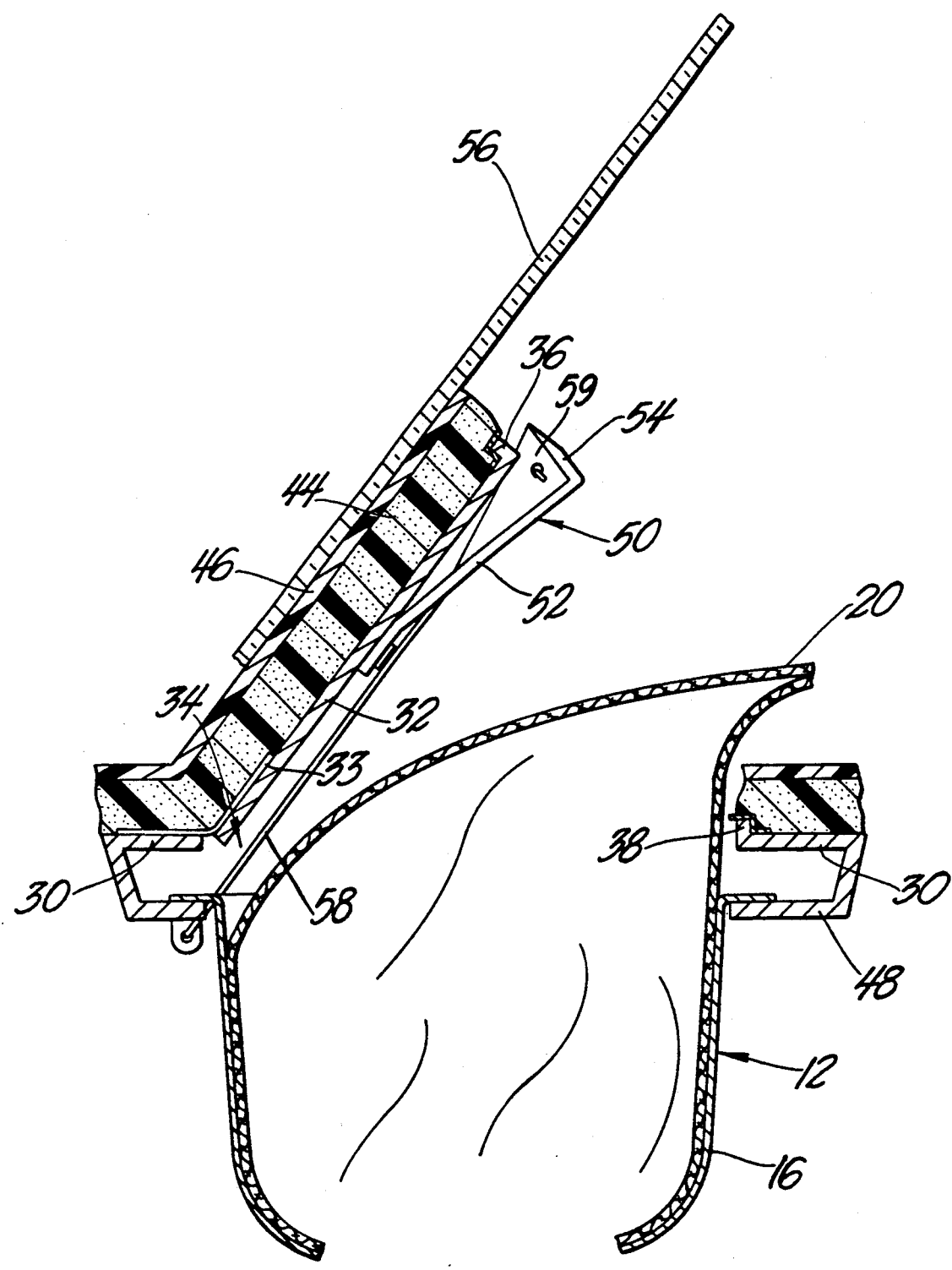
FIG. 4 is an enlarged fragmentary sectional view showing the cutting blades retracted after the air bag collapses.

The door 32 may be held against the windshield 56 by use of a hinge 33 that is permanently deformed by deployment of the air bag 20. As shown in FIG. 4 or it may not if a different type of hinge is used.

In any event, an important feature of the invention is that the cutter blades 54 of the piercing members 50 retract below the surface of the skin 46 that is attached to the door 32 as the air bag 50 collapses and the springs 52 overcome the force of the air bag 20 as shown in FIG. 4. Thus the occupants are protected against contact with the sharp cutting edges of the cutter blades 54 in any position of the door 32 and irrespective of the proximity of the windshield 56. Consequently the self piercing cover assembly 14 of this invention is quite versatile and universal in that it can be used in a great variety of applications and locations in the passenger compartment.

The invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. A self piercing cover assembly for concealing an air bag in a vehicle passenger compartment comprising:
   a support that is adapted for securement beneath a decorative panel in a vehicle passenger compartment;
   a door that closes a rectangular opening in the support for deployment of an air bag;
   the door having a rear end that is connected to the support by a hinge and a front end that is spaced from an edge of the support to maintain a slot at the front end of the door when the door is closed;
   the outer surface of the support and the hinged door being bonded to an elastomeric cushion formed in an underlying relationship to a polymeric skin that forms an outer surface of a decorative panel;
   the support having a depending bracket for holding an air bag housing beneath the opening in alignment with the door and that provides a space beneath the door;
   piercing means comprising:
   a plurality of piercing members disposed in the space beneath the door and attached to an underside of the door;
   the piercing members having springs holding the piercing members in a retracted position and cutter blades that are aligned with the slot to cut through the cushion and skin of the decorative panel;
   the piercing members being moveable outwardly by initial inflation of an air bag so that the cutter blades project through the slot and cut through the cushion and skin at several locations and form a tear line at the front end of the door that is easily ruptured by door itself as it is pivoted outwardly by force of an inflating air bag;
   the piercing members being retractable by the springs so that sharp cutting edges of the cutter blades are below the surface of the skin that is attached to the door as an air bag collapses and the springs overcome the force of the collapsing air bag to protect against contact with the sharp cutting edges of the cutter blades,
   the front end of the door having a flange that is spaced from a flange of the support to define the slot that is maintained when the door is closed and reduces the thickness of the cushion to be cut by the cutter blades, and the cutter blades having tips that are disposed between the flanges.

2. A self-piercing cover assembly for concealing an air bag in a vehicle passenger compartment comprising:

a support that is adapted for securement beneath a decorative panel in a vehicle passenger compartment;

a door that closes a rectangular opening in the support for deployment of an air bag;

the door having a rear end that is connected to the support by a hinge and a front end that is spaced from an edge of the support to maintain a slot at the front end of the door when the door is closed;

the outer surface of the support and the hinged door being bonded to an elastomeric cushion formed in an underlying relationship to a polymeric skin that forms an outer surface of a decorative panel;

the support having a depending bracket for holding an air bag housing beneath the opening in alignment with the door and that provides a space beneath the door;

piercing means comprising:

a plurality of piercing members disposed in the space beneath the door and attached to an underside of the door;

the piercing members having springs holding the piercing members in a retracted position and cutter blades that are aligned with the slot to cut through the cushion and skin of the decorative panel;

the piercing members being moveable outwardly by initial inflation of an air bag so that the cutter blades project through the slot and cut through the cushion and skin at several locations and form a tear line at the front end of the door that is easily ruptured by door itself as it is pivoted outwardly by force of an inflating air bag;

the piercing members being retractable by the springs so that sharp cutting edges of the cutter blades are below the surface of the skin that is attached to the door as an air bag collapses and the springs overcome the force of the collapsing air bag to protect against contact with the sharp cutting edges of the cutter blades;

the front end of the door having a flange that is spaced from a flange of the support to define the slot that is maintained when the door is closed and reduces the thickness of the cushion to be cut by the cutter blades;

the cutter blades having tips that are disposed between the flanges;

the support being secured beneath the decorative panel by being insert molded as part of the decorative panel itself; and the slot being sealed by tape to facilitate insert molding the support as part of the decorative panel.

3. A self piercing cover assembly for concealing an air bag in a vehicle passenger compartment comprising:

a support that is adapted for securement beneath a decorative panel in a vehicle passenger compartment;

a door that closes a rectangular opening in the support for deployment of an air bag;

the door having a rear end that is connected to the support by a hinge and a front end that is spaced from an edge of the support to maintain a slot at the front end of the door when the door is closed;

the outer surface of the support and the hinged door being bonded to an elastomeric cushion formed in an underlying relationship to a polymeric skin that forms an outer surface of a decorative panel;

the support having a depending bracket for holding an air bag housing beneath the opening in alignment with the door and that provides a space beneath the door;

piercing means comprising:

a plurality of piercing members disposed in the space beneath the door and attached to an underside of the door;

the piercing members having springs holding the piercing members in a retracted position and cutter blades that are aligned with the slot to cut through the cushion and skin of the decorative panel;

the piercing members being moveable outwardly by initial inflation of an air bag so that the cutter blades project through the slot and cut through the cushion and skin at several locations and form a tear line at the front end of the door that is easily ruptured by door itself as it is pivoted outwardly by force of an inflating air bag;

the piercing members being retractable by the springs so that sharp cutting edges of the cutter blades are below the surface of the skin that is attached to the door as an air bag collapses and the springs overcome the force of the collapsing air bag to protect against contact with the sharp cutting edges of the cutter blades;

the piercing members at the ends of the door having gussets at their outboard sides that have sharp edges, and the self piercing air bag cover assembly also including cutting wires that are attached to the support in alignment with each side of the door and to the gusset plates to cut through the cushion and skin at the sides of the door.

4. A self piercing cover assembly for concealing an air bag in a vehicle passenger compartment comprising:

a support that is adapted for securement beneath an instrument panel;

a door that closes an opening in the support for deployment of an air bag;

the door having a rear end that is connected to the support by a hinge and a front end that is spaced from an edge of the support to maintain a slot at the front end of the door when the door is closed;

the outer surface of the support and the hinged door being bonded to an elastomeric cushion formed in an underlying relationship to a polymeric skin that forms an outer surface of a decorative panel;

support having a depending bracket for holding an air bag housing beneath the rectangular opening in alignment with the door and that provides space beneath the door;

a plurality of generally L-shaped piercing members disposed in the space beneath the door and having longer legs that are attached to an underside of the door at one end;

the longer legs of the piercing members slanting away from the underside of the door to provide cantilevered leaf springs holding the piercing members in a retracted position with respect to the door;

the generally L-shaped piercing members having shorter legs that have sharp cutting edges to form cutter blades that are aligned with the slot to cut through the cushion and skin of the decorative panel;

the piercing members being moveable outwardly by the initial inflation of an air bag packed in the air bag housing so that the cutter blades project through the slot and cut through the cushion and skin at several locations and form a greatly weakened tear line at the front end of the door that is easily ruptured by door itself as it is pivoted upwardly by the force of the inflating air bag;

the piercing members being retractable so that the cutting edges of the sharp cutter blades are below the surface of the skin that is attached to the door as the air bag collapses and the springs overcome the force of the air bag to protect against contact with the sharp cutting edges of the cutter blades; and the front end of the door having a flange that is spaced from a flange of the support to define the slot that is maintained when the door is closed.

5. A self piercing cover assembly for concealing an air bag in a vehicle passenger compartment comprising:

a support that is adapted for securement beneath an instrument panel;

a door that closes an opening in the support for deployment of an air bag;

the door having a rear end that is connected to the support by a hinge and a front end that is spaced from an edge of the support to maintain a slot at the front end of the door when the door is closed;

the outer surface of the support and the hinged door being bonded to an elastomeric cushion formed in an underlying relationship to a polymeric skin that forms an outer surface of a decorative panel;

the support having a depending bracket for holding an air bag housing beneath the rectangular opening in alignment with the door and that provides space beneath the door;

a plurality of generally L-shaped piercing members disposed in the space beneath the door and having longer legs that are attached to an underside of the door at one end;

the longer legs of the piercing members slanting away from the underside of the door to provide cantilevered leaf springs holding the piercing members in a retracted position with respect to the door;

the generally L-shaped piercing members having shorter legs that have sharp cutting edges to form cutter blades that are aligned with the slot to cut through the cushion and skin of the decorative panel;

the piercing members being moveable outwardly by the initial inflation of an air bag packed in the air bag housing so that the cutter blades project through the slot and cut through the cushion and skin at several locations and form a greatly weakened tear line at the front end of the door that is easily ruptured by door itself as it is pivoted upwardly by the force of the inflating air bag;

the piercing members being retractable so that the cutting edges of the sharp cutter blades are below the surface of the skin that is attached to the door as the air bag collapses and the springs overcome the force of the air bag to protect against contact with the sharp cutting edges of the cutter blades; and the slot being sealed by tape to facilitate insert molding the support as part of the decorative panel.

6. A self piercing cover assembly for concealing an air bag in a vehicle passenger compartment comprising:

a support that is adapted for securement beneath an instrument panel;

a door that closes an opening in the support for deployment of an air bag;

the door having a rear end that is connected to the support by a hinge and a front end that is spaced from an edge of the support to maintain a slot at the front end of the door when the door is closed;

the outer surface of the support and the hinged door being bonded to an elastomeric cushion formed in an underlying relationship to a polymeric skin that forms an outer surface of a decorative panel;

the support having a depending bracket for holding an air bag housing beneath the rectangular opening in alignment with the door and that provides space beneath the door;

a plurality of generally L-shaped piercing members disposed in the space beneath the door and having longer legs that are attached to an underside of the door at one end;

the longer legs of the piercing members slanting away from the underside of the door to provide cantilevered leaf springs holding the piercing members in a retracted position with respect to the door;

the generally L-shaped piercing members having shorter legs that have sharp cutting edges to form cutter blades that are aligned with the slot to cut through the cushion and skin of the decorative panel;

the piercing members being moveable outwardly by the initial inflation of an air bag packed in the air bag housing so that the cutter blades project through the slot and cut through the cushion and skin at several locations and form a greatly weakened tear line at the front end of the door that is easily ruptured by door itself as it is pivoted upwardly by the force of the inflating air bag;

the piercing members being retractable so that the cutting edges of the sharp cutter blades are below the surface of the skin that is attached to the door as the air bag collapses and the springs overcome the force of the air bag to protect against contact with the sharp cutting edges of the cutter blades;

the piercing members at the ends of the door having gusset plates at their outboard sides that have sharp edges, and the self piercing air bag cover assembly also including cutting wires that are attached to the support in alignment with each side of the door and the gusset plates to cut through the cushion and skin at the sides of the door.

7. A self piercing cover assembly for concealing an air bag in a vehicle passenger compartment comprising:

a support that is insert molded as part of the a decorative panel for a vehicle passenger compartment, a door that closes a rectangular opening in the support for deployment of an air bag;

the door having a rear end that is connected to the support by a hinge and a flange at a front end that is spaced from a flange at an edge of the support to maintain a slot at the front end of the door when the door is closed;

the outer surface of the support and the hinged door being bonded to an elastomeric cushion formed in an underlying relationship to a polymeric skin that forms an outer surface of the decorative panel;

the support having a depending bracket for holding an air bag housing beneath the rectangular opening in alignment with the door and that provides a space beneath the door;

a plurality of generally L-shaped piercing members disposed in the space beneath the door and having longer legs that are attached to an underside of the door at one end;

the longer legs of the piercing members slanting away from the underside of the door to provide cantilevered leaf springs holding the piercing members in a retracted position with respect to the door;

the generally L-shaped piercing members having shorter legs that have sharp cutting edges at their tips to form cutter blades that have their tips disposed between the flanges defining the slot to cut through the cushion and skin of the decorative panel;

the cutter blades having a height that is greater than the combined thickness of the cushion and the skin above the flanges so that the cutting blades cut cleanly and completely through the cushion and skin;

the piercing members being moveable outwardly by the initial inflation of the air bag so that the cutter blades project through the slot and cut through the cushion and skin at several locations and form a greatly weakened tear line at the front end of the door that is easily ruptured by door itself as it is pivoted upwardly by the force of the inflating air bag;

the piercing members being made of material that is sufficiently resilient so that the cutting blades retract below the surface of the skin associated with the door after the door makes an air bag deployment opening in the cushion and skin and the air bag collapses to protect against contact with the sharp cutting edges of the cutter blades; and the slot being sealed by tape to facilitate insert molding the support as part of the decorative panel.

8. A self piercing cover assembly for concealing an air bag in a vehicle passenger compartment comprising:

a support that is insert molded as part of the a decorative panel for a vehicle passenger compartment, a door that closes a rectangular opening in the support for deployment of an air bag;

the door having a rear end that is connected to the support by a hinge and a flange at a front end that is spaced from a flange at an edge of the support to maintain a slot at the front end of the door when the door is closed;

the outer surface of the support and the hinged door being bonded to an elastomeric cushion formed in an underlying relationship to a polymeric skin that forms an outer surface of the decorative panel;

the support having a depending bracket for holding an air bag housing beneath the rectangular opening in alignment with the door and that provides a space beneath the door;

a plurality of generally L-shaped piercing members disposed in the space beneath the door and having longer legs that are attached to an underside of the door at one end;

the longer legs of the piercing members slanting away from the underside of the door to provide cantilevered leaf springs holding the piercing members in a retracted position with respect to the door;

the generally L-shaped piercing members having shorter legs that have sharp cutting edges at their tips to form cutter blades that have their tips disposed between the flanges defining the slot to cut through the cushion and skin of the decorative panel;

the cutter blades having a height that is greater than the combined thickness of the cushion and the skin above the flanges so that the cutting blades cut cleanly and completely through the cushion and skin;

the piercing members being moveable outwardly by the initial inflation of the air bag so that the cutter blades project through the slot and cut through the cushion and skin at several locations and form a greatly weakened tear line at the front end of the door that is easily ruptured by door itself as it is pivoted upwardly by the force of the inflating air bag;

the piercing members being made of material that is sufficiently resilient so that the cutting blades retract below the surface of the skin associated with the door after the door makes an air bag deployment opening in the cushion and skin and the air bag collapses to protect against contact with the sharp cutting edges of the cutter blades;

the piercing members at the end of the door having gusset plates at their outboard sides that have sharp edges, and the self piercing air bag cover assembly also including cutting wires that are attached to the support in alignment with each side of the door and to the gusset plates to cut through the cushion and skin at the sides of the door.

* * * * *